Nov. 11, 1958    M. C. SEIM    2,859,683
VENTILATING TUNNEL
Filed Dec. 23, 1954    2 Sheets-Sheet 1

INVENTOR
MAYNARD C. SEIM
BY
ATTORNEY

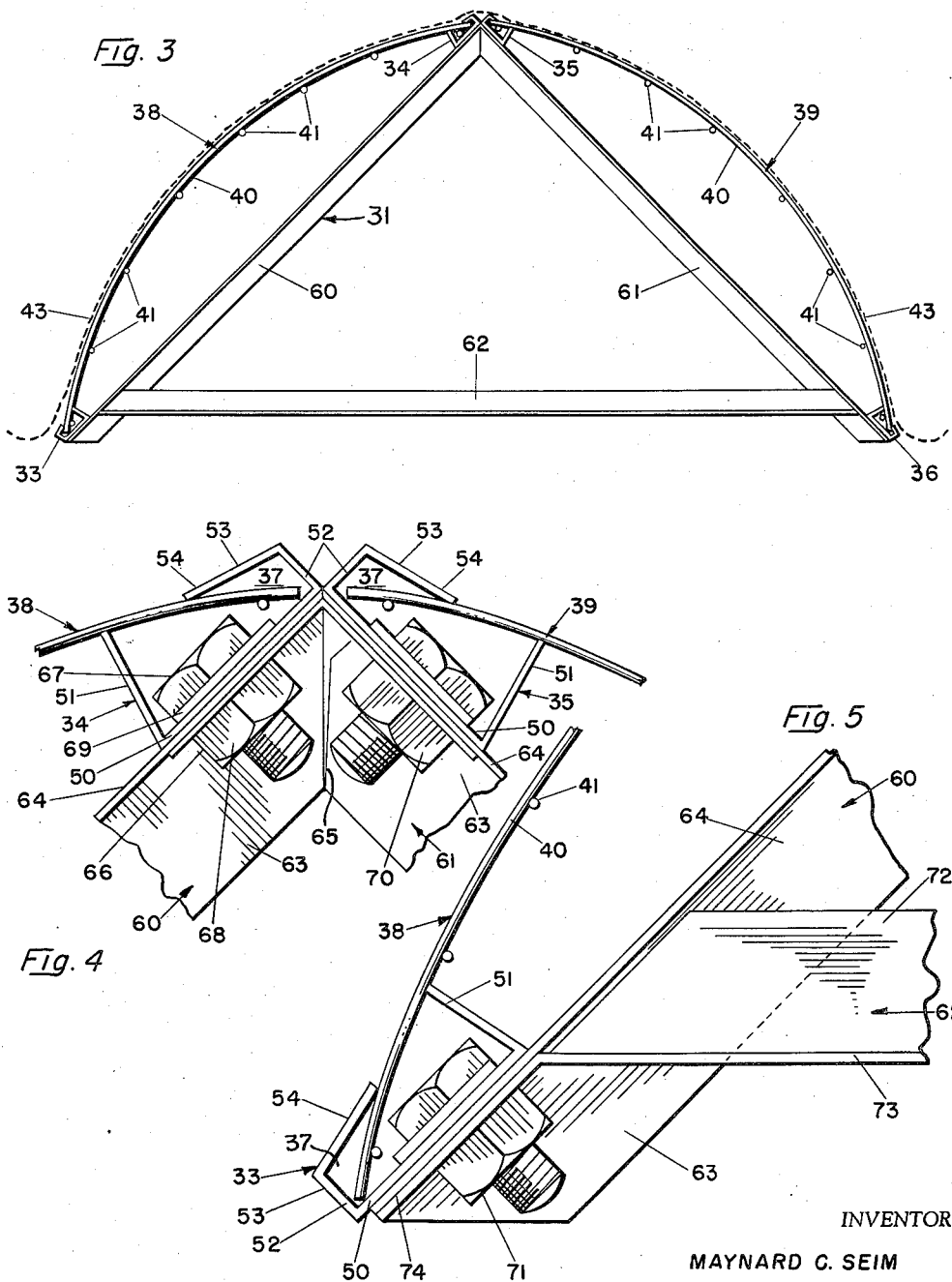

United States Patent Office 2,859,683
Patented Nov. 11, 1958

2,859,683

VENTILATING TUNNEL

Maynard C. Seim, Nankin Township, Wayne County, Mich., assignor to National Steel Corporation, a corporation of Delaware Application December 23, 1954, Serial No. 477,215

7 Claims. (Cl. 98—56)

This invention relates to ventilating tunnels and more particularly to improved ventilating tunnels for use in ventilating granular material.

Today large quantities of grain are stored for extended periods of time in buildings especially designed for that purpose. Buildings most generally employed for this purpose are of a type that may be erected at relatively low cost and usually comprise elongated concrete slab flooring upon which the grain is piled and elongated walls and an arched roof surrounding and enclosing the piled grain. In the storage of grain it is essential that air be circulated through the stored grain for adequate ventilation of the grain. In grain storing buildings of the above type presenting elongated floor areas upon which the grain is piled to relatively great depth, severe problems exist which must be overcome for adequate ventilation of the grain.

A forced air system has proven to be the most successful solution to the grain ventilating problems in grain storage buildings of the elongated type. In such a system air is required to be circulated through the stored grain for extended periods. For this purpose a ventilating tunnel is first placed on the floor and then the grain is piled on the floor so as to cover the tunnel. The tunnel is connected to a source of circulating air and is provided with passageways through its walls for air flow therethrough. The passageways in the tunnel walls are formed by openings in the tunnel walls of a size smaller than the size of the grain particles to prevent grain from entering the tunnel. The tunnel is arranged on the floor of the building with respect to the pile of grain so that all of the grain will be properly ventilated. Branch tunnels are sometimes employed leading from a centrally located main tunnel positioned longitudinally of the building and connected directly to the source of circulating air. The source of ventilating air may be supplied by a motor driven fan or blower connected by duct means to the ventilating tunnel.

Generally, there are two types of grain ventilation problems. One is the removal of excessive moisture from grain, and the other is the controlling of the moisture distribution through the mass of grain to prevent spoilage arising from the gradual development of concentrations of moisture in regions of the grain mass. The ventilating tunnel provided by the present invention may be employed to solve either problem.

When it is desired to remove excessive moisture from stored grain a relatively large rate of air must be circulated through the mass of grain. For this reason it is necessary to provide ventilating tunnels of relatively large cross-sectional area. In cases where the grain stored includes the desired moisture content and only safe storage is to be provided, it is required that only a relatively small rate of air be circulated through the mass of grain, and the air circulation may be discontinuous. Consequently, ventilating tunnels of relatively smaller cross-sectional area may be employed for grain ventilation where there is no problem of moisture removal.

One type of ventilating tunnel provided heretofore is made up of a plurality of tunnel sections adapted to be placed in end-to-end relation to form an elongated ventilating tunnel. The tunnel sections are usually of arched cross-sectional shape and are provided as integral units for structural reasons and also so that the tunnel may be quickly assembled with a minimum number of operational steps. Although the prior tunnel sections are usually designed so they may be nested together to reduce their volume for shipment or storage, their required cross-sectional shape presents a bulky assembly when in nested relation. This is especially so in the case of tunnel sections designed to form an elongated ventilating tunnel for use in drying or removing excessive moisture from stored grain.

It is therefore an object of the present invention to provide a novel tunnel section which occupies a relatively small volume for shipment or storage as compared to its cross-sectional area.

Another object of the present invention is to provide a novel tunnel section that may be easily assembled or disassembled within a relatively short period of time without requiring special techniques or an inconvenient number of operational steps.

Another object is to provide a novel tunnel section of the above character made up of a number of component elements each of which is shaped to lend to the formation of a compact storage or shipping package of relatively small volume as compared to the cross-sectional area of the tunnel section.

Still another object of the present invention is to provide a novel tunnel section that may be easily assembled and disassembled to present a relatively small volume for shipment or storage and which may be provided in a wide range of cross-sectional areas.

A still further object of the present invention is to provide a novel tunnel section of the above type in which the component elements comprise structural members of relatively simple design which may be easily fabricated to thus provide a tunnel section that may be manufactured at relatively low cost.

Other objects and features of the present invention will appear more fully from the following detailed description considered in connection with the accompanying drawings which disclose one embodiment of the invention. It is to be expressly understood however, that the drawings are designed for purposes of illustration only and not as a definition of the limits of the invention, reference for the latter purpose being had to the appended claims.

In the drawings in which similar reference characters denote similar elements throughout the several views:

Fig. 3 is an end view of the tunnel section shown in Fig. 2, and

Figs. 4 and 5 are enlarged views illustrating structural details of portions of the tunnel section shown in Figs. 2 and 3.

The present invention provides a tunnel section of the type adapted to be positioned in end-to-end relation with a plurality of similar tunnel sections to form an elongated ventilating tunnel. Each tunnel section includes an elongated portal frame adapted to support elongated extended surface panels in arcuate configuration. The arrangement is such that the arcuate panels comprise substantially the walls of the tunnel section, and the panels are provided with a plurality of openings of a total area greater than the area of the material forming the panels to provide passageways for the flow of air through the walls of the tunnel section. In order to prevent grain or other granular material from flowing through the openings into the tunnel section a screen covering of fine mesh is placed over the wall of the tunnel section, the gage of the wire mesh is selected to provide openings therein smaller than the particles of granular material. The portal frame comprises a plurality of linear members of simple cross-sectional shape designed so that they may be easily secured together by means of a relatively small number of removable securing means such as bolts provided with threaded nuts, for example. A number of the linear members form upstanding ribs extending transversely of the tunnel section and laterally spaced from each other, while other linear members comprise a plurality of elongated members supported by the ribs and extending longitudinally of the tunnel section. Each elongated member is provided with a longitudinal slot and the elongated members are mounted in pairs with their slots in face-to-face relation for receiving the longitudinal edges of a panel member bridging the space between the elongated members of each pair. The panel members have a width dimension greater than the spacing between pairs of elongated members and the elongated members are provided with arch forming means so that the panel members bow outwardly away from the ribs and possess a predetermined arcuate cross-sectional shape.

Figure 1:
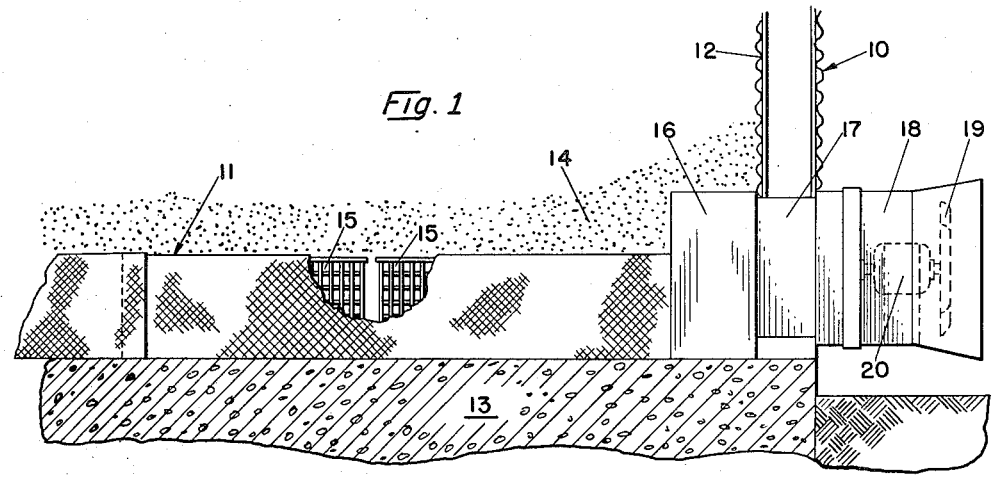
Fig. 1 is a view in section of a portion of a grain storage building including a ventilating tunnel constructed in accordance with the principles of the present invention.

With reference more particularly to Fig. 1 of the drawings, a grain storage building 10 is shown therein provided with a grain ventilating tunnel 11 constructed in accordance with the principles of the present invention. The building 10 includes an end wall 12 and side walls, another end wall and a roof, not shown, and is provided with a concrete slab flooring 13 upon which a mass of grain 14 is supported in a pile. The ventilating tunnel is made up of a plurality of tunnel sections 15 positioned in end-to-end relation. One end of the first tunnel section, that is, the tunnel section on the right as viewed in the drawing, is connected to an adapter 16. The adapter 16 may be formed of sheet metal to provide a chamber communicating with the first section of the tunnel through a suitable opening at one of its ends, and being provided at its other end with an extension 17 passing through the end wall 12 and joined to a fan housing 18. A fan 19 which may be driven by an electric motor 20, is positioned within the fan housing 18 and is adapted upon operation to circulate air through the grain by way of the grain ventilating tunnel.

Figure 2:
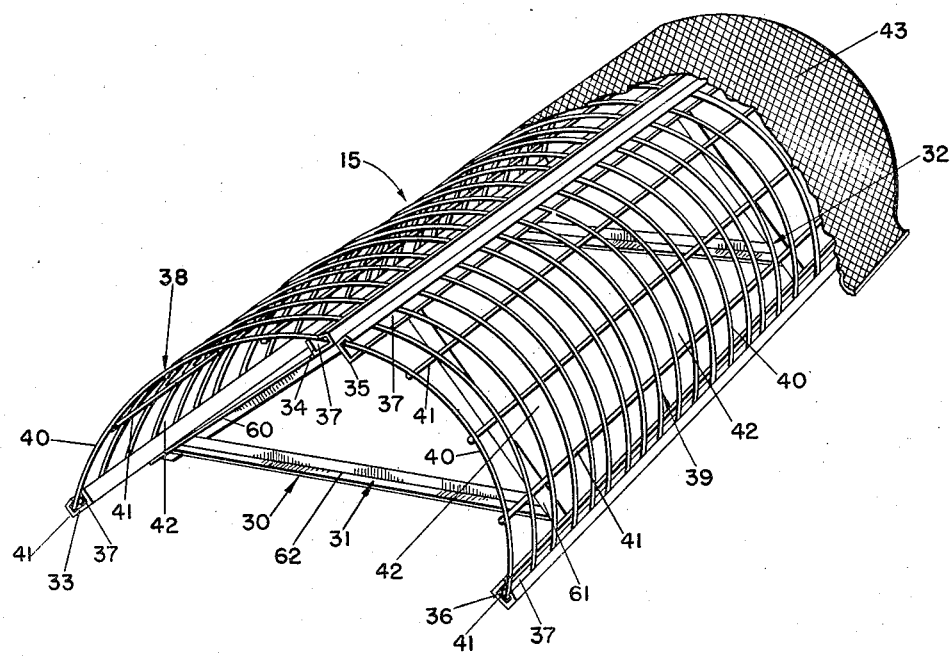
Fig. 2 is an isometric view, partly broken away, of a ventilating tunnel section embodying the principles of the present invention.

The tunnel sections shown in Fig. 1 are identical and only one tunnel section will be described in detail. As shown in Figures 2 and 3, each tunnel section 15 includes a portal frame 30 comprising a pair of transversely extending upright ribs 31 and 32 and a plurality of longitudinally extending elongated members 33, 34, 35 and 36. The ribs 31 and 32 are spaced from each other longitudinally of the tunnel section and are located adjacent its ends. The elongated members 33, 34, 35 and 36 extend longitudinally of the tunnel section parallel to each other and are secured to the ribs 31 and 32. The manner in which the elongated members and the ribs are joined together to form the portal frame as well as the structural details of the ribs including side members 60 and 61 and a transverse member 62 will be described more fully below. Preferably an elongated member is joined to the lower end of the ribs on both sides to form horizontal sill members for the tunnel section, such as elongated members 33 and 36 as shown in the drawings. The remaining elongated members 34 and 35 are positioned intermediate the elongated members 33 and 36 at a point above the latter elongated members. Each of the elongated members is provided with a longitudinal slot 37, and pairs of the elongated members such as 33, 34 and 35, 36 are mounted in spaced relation with their respective longitudinal slots 37 in substantial face-to-face relation and opening outwardly with respect to the ribs. In this arrangement the longitudinal member 34 of one pair and the longitudinal member 35 of an adjacent pair are mounted in contiguous relation with their respective slots 37 in substantial back-to-back relation. The contiguous elongated members 34 and 35 may comprise an integral member provided with a pair of opposed longitudinal slots. Also, although the tunnel section shown in Fig. 2 includes two pairs of elongated members, it is to be expressly understood that the present invention includes the construction of tunnel sections including a greater number of pairs of elongated members in which each pair includes an elongated member in back-to-back and contiguous relation with an elongated member of an adjacent pair and with the longitudinal slots of the contiguous elongated members in substantial opposed relation.

The longitudinal slots 37 of the pairs of elongated members 33, 34 and 35, 36 are adapted to receive the longitudinal edges of elongated panel members 38 and 39, respectively. The panel members 38 and 39 bridge the space between respective pairs of elongated members and together constitute substantially the wall of the tunnel section. The panel members have a length dimension corresponding substantially to the length of the elongated members and a width dimension greater than the linear distance between pairs of elongated members. Thus when the longitudinal edges of the panel members are inserted in the longitudinal slots 37 of respective pairs of elongated members the panel members are caused to bow outwardly away from the ribs 31 and 32 to form a tunnel section wall of arch-shaped cross-section. As described in detail below, the elongated members include means for controlling the shape of the radius of curvature of each of the panel members to thus determine the cross-sectional configuration of the tunnel wall.

As shown in Fig. 2, the panel members 38 and 39 each comprise a sheet of wire fabric including a plurality of transversely extending longitudinally spaced members 40 and a plurality of longitudinally extending transversely spaced members 41. The members 40 and 41 are joined together at their points of intersection, such as by welds for example, and the transverse members 40 are of larger cross-sectional area than the longitudinal members 41 and are spaced a less distance from each other than spacing between the longitudinal members 41. The panel members are positioned with the members 40 extending transversely of the tunnel section to provide a structure presenting maximum load carrying characteristics. The sheets of wire fabric include a plurality of openings 42 comprising a greater portion of the total area of the panel members. With this structure air may freely traverse the panel members for circulation through the stored granular material. In order to prevent particles of granular material from passing through the openings 42 into the tunnel section, a piece of wire screen 43 of fine mesh is positioned over the wall of the tunnel section with its longitudinal edges extending outwardly over the floor adjacent the edges of the tunnel section. The mesh of the screen 43 is selected to present openings smaller than the particles of granular material. Although the panel members 38 and 39 are illustrated as being formed from wire fabric, other materials that meet the following requirements may be employed. It is necessary that the panel members be constructed of a material having sufficient strength to support the overlying grain without failing in compression, while allowing deformation upon its longitudinal edges being inserted in the longitudinal slots of pairs of elongated members. Also, the panel members must include a plurality of openings preferably having a total cross-sectional area greater than the cross-sectional area of the material comprising the panel members. Expanded metal sheets comprise another form of material which meet these requirements and may be utilized to form the panel members 38 and 39. Also plastic sheet materials may be employed.

The cross-sectional shape of the longitudinal members and the function of the slots 37 are illustrated in detail in Figs. 4 and 5 of the drawings. Preferably the elongated members are identical being formed from a single piece of sheet material, such as metal, to include a longitudinally extending base portion 50 adapted to be secured to the ribs 30 in a manner described below. An elongated flange portion 51 is joined along its inside longitudinal edge to one of the longitudinal edges of the base portion 50 and extends outwardly from one side of the base portion in a direction away from the ribs at an acute angle with respect to the plane of the base portion. The other longitudinal edge of the base portion is joined to a leg member 52 of an elongated angle flange portion 53 also including a leg member 54. The angle flange portion 53 is positioned on the same side of the base portion as the flange portion 51 with its leg member 54 extending in a direction toward but spaced from the flange portion 51. For a purpose that will appear more fully below, the terminating longitudinal edge of the flange portion 51 lies in a plane displaced from the plane of the base portion a greater distance than the outer edge of the leg member 54. The angle flange portion 53 cooperates with the base portion 50 to form the longitudinal slot 37 extending throughout the length of the elongated members. The free edges of the leg member 54 and the flange portion 51 define an opening for the slot 37.

As mentioned above, the present invention provides means for determining the radius of curvature of the panel members when inserted in the longitudinal slots of spaced pairs of elongated members. As shown more clearly in Figs. 4 and 5 this means comprises the shape and relation positioning of the flange portion 51 and the angle flange portion 53. When the longitudinal edge of a panel member is inserted in the longitudinal slot 37 of one of the elongated members, the outer surface of the panel member contacts the free edge of the leg member 54 with the line of contact on the outer surface of the panel member being spaced from its longitudinal edge, while the inner surface of the panel member lies against the free edge of the flange portion 51 with the line of contact on the inner surface being spaced a greater distance from the longitudinal edge of the panel member. By terminating the free edge of the flange portion 51 in a plane spaced a greater distance from the plane of the base portion 50 than the spacing of the free edge of the leg member 54, the free edge of the flange portion 51 acts as a fulcrum causing the region of the panel member adjacent its longitudinal edge to bend in the form of an arch. Thus a more uniform radius of curvature is obtained throughout the panel members.

As shown more clearly in Fig. 3, the ribs 31 and 32 of the portal frame 30 comprise open triangular structures presenting a salient angle. Each rib includes a pair of side members 60 and 61 inclined inwardly toward each other with their lower ends positioned adjacent the lower longitudinal edges of the tunnel sections and with their upper ends in abutting relation at the apex of the salient angle in the region of a vertical plane passing through the central axis of the tunnel section. The ribs also include a transverse member 62 connected between the side members 60 and 61 at points of the side members spaced from but adjacent their lower ends.

In accordance with the principles of the present invention, the components making up the portal frame 30 are designed in such a manner so that the frame may be assembled or disassembled with relative ease by performing a minimum number of joining operations. For this purpose the side members 60 and 61 and the transverse member 62 of the ribs 31 comprise elongated angle members fabricated in such a manner so that a single connecting member is required to join the transverse member and one of the elongated members to the lower end of each of the side members while only two connecting members are required to join the abutting ends of the side members at the apex of the angle and to secure an elongated member to the upper end of each of the side members. Fig. 4 of the drawings illustrates the manner in which the abutting ends of the side members are joined together at the apex of the angle and in which a longitudinal member is connected to the upper end of the side members. As shown, the side members 60 and 61 are of angular cross-section including flanges 63 and 64 and are positioned with the flanges 63 lying in a vertical plane and the flanges 64 disposed at right angles thereto. The terminating edges of the flanges 63 at the adjacent ends of the side members 60 and 61 are cut at a proper angle to establish an abutting relation with each other, and with the terminating ends of the flanges 64. An angle member 65, having a width substantially corresponding to the width of the flanges 64, is provided with an angle corresponding to the angle formed by the members 60 and 61, and is positioned adjacent the inside surface of the flanges 64. The sides of the flange 65 extending downwardly from the adjacent ends of the flanges 64 toward the lower end of the side members a distance corresponding substantially to the width of the base portion 50 of the elongated members. The elongated members 34 and 35 are positioned on the outside surface of the flange 64 of respective side members opposite the region of respective sides of the flange 65. The elongated member 34 and a portion of the flange 65 are secured to the flange 64 of the side member 60 by means of a nut and bolt arrangement 66 passing through a suitable opening provided in each of the connected elements. For convenience in assembling the portal frame the bolt is inserted through the elongated member toward the flange 65 with the head 67 contacting the outside surface of the elongated member and with the nut 68 positioned on the inside surface of the flange 64. A washer 69 may be provided for the bolt head if desired. The elongated member 35 and the flange 65 are secured to the flange 64 of the side member 61 in a similar manner by means of a nut and bolt arrangement 70.

The manner in which the longitudinal member 33 and one end of the transverse member 62 are joined to the lower end of the side members 60 is illustrated in Fig. 5 of the drawings. As shown, the base portion 50 of the elongated member 33 lies flat against the outside surface of the flange 64 at the lower end of the side member 60 and is secured thereto by means of a bolt and nut arrangement 71. The transverse member 62 is also of angular cross-section including a vertically disposed flange 72 and a horizontally disposed flange 73. The vertical flange 72 lies flat against the flange 63 and its end is cut at an angle corresponding to the angle of the side member 60 so that its terminating cage lies adjacent the inside surface of the flange 64. The horizontal flange 73 includes a terminating end portion 74 bent downwardly at an angle to lie in a plane parallel to the plane of the flange 64 of the side member 60 and lie flat against the inside surface of the latter flange opposite the base portion 50 of the elongated member 33. The portion 74 is provided with an opening aligned with the openings through the flange 64 and the base portion 50 and is secured thereto by means of the nut and bolt arrangement 71. The longitudinal member 36 and the other end of the transverse member 62 are connected to the side member 61 in a similar manner.

Tunnel sections embodying the principles of the present invention may be manufactured at relatively low cost since a number of identical component members are employed. With respect to the portal frame, each of the elongated members 33, 34, 35 and 36 are identical as well as the side members 60 and 61 and the transverse member 62 of the ribs 31. In addition, the components forming the ribs are of identical cross-section and the side members differ only from the transverse members with respect to length and the shape of their terminating ends. Thus the entire portal frame is formed by utilizing two differently shaped major components. Also, each tunnel section includes a pair of identical panel members.

The major components making up the portal frame 30 are linear elements of relatively small cross-sectional area, while the panel members 38 and 39 when unassembled comprise flat members. Thus the major components of the tunnel section, when disassembled, may be formed into a compact assembly which not only occupies a relatively small volume as compared to the cross-sectional area of the assembled tunnel section but which lends toward efficient packing for storage or shipment.

When it is desired to assemble a tunnel section constructed in accordance with the principles of the present invention, the ends of a transverse member 62 are connected to the lower ends of the side members 60 and 61 and to the elongated members 33 and 36 by means of single nut and bolt devices 71 in the manner shown in Fig. 5. The upper ends of the side members 60 and 61 are then joined together and to the elongated members 33 and 35 by means of the angle member 65 and nut and bolt devices 56 and 70 in the manner shown in Fig. 4. Thereupon the other rib may be assembled and attached to the elongated members adjacent their other ends in a similar manner. The panel members 38 and 39 are then assembled onto the portal frame. This is accomplished by inserting the lower longitudinal edge of one of the panel members into the longitudinal slot of the elongated member 33 or 36 and then by inserting the upper or other longitudinal edge of the panel member into the longitudinal slot of the corresponding elongated member 34 or 35 by deforming the panel member outwardly away from the ribs a sufficient distance to allow entry of its longitudinal edge through the opening provided between the flange portion 51 and the leg member 54 of the elongated member. The other panel member is assembled in a similar manner with its longitudinal edges inserted in the longitudinal slots of respective elongated members. The ventilating tunnel section is formed by placing a plurality of tunnel sections in end-to-end relation, preferably with space provided between adjacent ends of the tunnel sections. A piece of fine mesh screen 43 is then placed over the tunnel sections bridging the space between adjacent ends of the tunnel sections with the edges of the screen lying along the floor supporting the tunnel sections an appreciable distance laterally from the bottom edges of the tunnel sections.

Tunnel sections designed in accordance with the principles of the present invention are capable of carrying heavy loads applied by overlying granular material such as grain. While a number of factors determining the maximum permissible loading the tunnel sections may safely carry, the strength of the ribs as columns and the strength of the panel members in compression are the major limiting factors. The tunnel sections possess good longitudinal stability due to the stabilizing action provided by the panel members including longitudinal edges contacting the elongated members substantially throughout the length of the tunnel sections.

There is thus provided by the present invention a novel tunnel section of the type adapted to be placed in end-to-end relation with similar tunnel sections to provide an elongated ventilating tunnel for use in ventilating grain or other granular material. The tunnel sections include a plurality of component elements of similar size and shape designed in such a manner so that the tunnel section may be easily assembled and disassembled without necessitating special techniques while requiring only a relatively small number of operational steps. The major component elements are characterized so that when unassembled they present elements that may be formed into a compact package of relatively small volume as compared to the cross-sectional area of the assembled tunnel section and of convenient shape for economical shipment and storage.

Although only one embodiment of the invention has been disclosed and described herein, it is expressly understood that various changes and substitutions may be made therein without departing from the spirit of the invention, as well understood by those skilled in the art. For example, although the tunnel section disclosed and described herein includes one pair of elongated members in contiguous back-to-back relation requiring two panel members, it is to be expressly understood that a tunnel section including more than one pair of elongated members in contiguous back-to-back relation and requiring more than two panel members is within the scope of the present invention. The latter arrangement may have special utility in the formation of tunnel sections having very large cross-sectional areas allowing construction of panel members of relatively light gage material. In tunnel sections including more than two pairs of elongated members in contiguous back-to-back relation it is understood that the ribs of the portal frame would be modified to provide proper support. Reference will therefore be had to the appended claims for a definition of the limits of this invention.

What is claimed is:

1. A tunnel section of the type adapted to be placed in end-to-end relation with similar tunnel sections to form an elongated tunnel for use in ventilating granular material, comprising a plurality of spaced pairs of longitudinally extending elongated members, each of the elongated members having a central longitudinal axis and a longitudinal slot including a member defining a side wall of the slot, upright rib members forming open portal frames, the rib members being spaced longitudinally of the elongated members and including means for supporting the elongated members with the longitudinal axes of the elongated members defining spaced points of an erect arch-shaped curve and with the longitudinal axes of pairs of elongated members being located at successive points along the arch-shaped curve, the elongated member of one pair being in contiguous relation with an elongated member of an adjacent pair and the pairs of elongated members being positioned with the slot of one member facing the slot of the other member and with the slot side wall defining member of one elongated member extending generally in the direction toward the slot side wall defining member of the other elongated member, and an elongated pervious panel member positioned between pairs of elongated members with the longitudinal edges of the panel member extending into the longitudinal slots of the elongated members, the panel member having a dimension perpendicular to the longitudinal axis of the elongated members greater than the distance between slots of pairs of elongated members and the panel member being curved and bowed outwardly and contacting the slot side wall defining members, the slots having sufficient width to receive the curved marginal edges of the panel member.

2. Frame for a tunnel section as defined in claim 1 in which the elongated members include an elongated base portion, a first flange portion joined along one longitudinal edge of the base portion and extending outwardly from one side of the base portion, and an angle flange portion including one leg joined along the longitudinal leg of the base portion extending outwardly from the one side of the base portion and a second leg joined to the one leg and extending in a direction toward the first flange portion, the terminating edge of the first flange portion lying in a plane further removed from the base portion than the second leg of the angle flange portion.

3. A tunnel section of the type adapted to be placed in end-to-end relation with similar tunnel sections to form an elongated tunnel for use in ventilating granular material, comprising a portal structure including transversely extending upright angular ribs laterally spaced along the length of the structure and a plurality of pairs of elongated members secured to the ribs and extending longitudinally of the structure, one pair of elongated members being mounted on one side of the ribs and another pair being mounted on the other side of the ribs, an elongated member of the one pair being located adjacent the apex of the ribs and the other elongated member of the one pair being located adjacent the base of the ribs, one elongated member of the other pair being located adjacent the apex of the ribs and the second elongated member of the other pair being located adjacent the base of the ribs, the elongated members having a longitudinal slot including a member defining a side wall of the slot, the elongated members of each pair being relatively positioned with the slot of one member facing the slot of the other member and with the slot side wall defining member of one elongated member extending generally in the direction of the slot side wall defining member of the other member, and an elongated pervious panel member positioned between pairs of elongated members with the longitudinal edges of the panel member extending into the longitudinal slots of the elongated members, the panel member having a transverse dimension greater than the distance between slots of pairs of elongated members and the panel member being curved and bowed outwardly and contacting the slot side wall defining members, the slots having sufficient width to receive the curved marginal edges of the panel member.

4. Frame for a tunnel section as defined in claim 3 in which each of the elongated members includes an elongated base portion, a first elongated flange portion joined along one of the longitudinal edges of the base portion and extending outwardly therefrom in a direction away from the ribs and an angle flange portion including one leg joined along the other longitudinal edge of the base portion and extending outwardly therefrom in a direction away from the ribs and a second leg extending from the one leg in a direction toward the first flange portion and terminated in spaced relation with the first flange portion, the terminating edge of the first flange portion lying in a plane further removed from the base portion and the second leg.

5. A frame for a tunnel section as defined in claim 4 in which elongated members of the one pair and of the another pair are relatively positioned with the first elongated flange of one elongated member of each pair facing the first elongated flange of the other elongated member of each pair.

6. A tunnel section of the type adapted to be placed in end-to-end relation with similar tunnel sections to form an elongated tunnel for use in ventilating granular material, comprising a plurality of spaced pairs of longitudinally extending elongated members, each of the elongated members having a central longitudinal axis and a longitudinal slot including a member defining a side wall of the slot, upright rib members spaced longitudinally of the elongated members including means for supporting the elongated members with the longitudinal axes of the elongated members defining spaced points of an erect arch-shaped curve and with the longitudinal axes of pairs of elongated members being located at successive points along the arch-shaped curve, the elongated member of one pair being in contiguous relation with an elongated member of an adjacent pair and the pairs of elongated members being positioned with the slot of one member facing the slot of the other member and with the slot side wall defining member of one elongated member extending generally in the direction toward the slot side wall defining member of the other elongated member, an elongated pervious panel member positioned between pairs of elongated members with the longitudinal edges of the panel member extending into the longitudinal slots of the elongated members, the panel member having a dimension perpendicular to the longitudinal axis of the elongated members greater than the distance between slots of pairs of elongated members and the panel member being curved and bowed outwardly and contacting the slot side wall defining members, the slots having sufficient width to receive the curved marginal edges of the panel member and a longitudinal member spaced from the slot side wall defining member of each of the elongated members and located in front of the slot of respective elongated members and extending outwardly from the rib members and terminating beyond the slot side wall defining member in contact with the panel member to establish a predetermined arch-shape of the panel member.

7. A tunnel section of the type adapted to be placed in end-to-end relation with similar tunnel sections to form an elongated tunnel for use in ventilating granular material, comprising a plurality of spaced pairs of longitudinally extending elongated members, each of the elongated members having a central longitudinal axis and a longitudinal slot including a member defining a side wall of the slot, upright rib members spaced longitudinally of the elongated members including means for supporting the elongated members with the longitudinal axes of the elongated members defining spaced points of an erect arch-shaped curve and with the longitudinal axes of pairs of elongated members being located at successive points along the arch-shaped curve, the elongated member of one pair being in contiguous relation with an elongated member of an adjacent pair and the pairs of elongated members being positioned with the slot of one member facing the slot of the other member and with the slot side wall defining member of one elongated member extending generally in the direction toward the slot side wall defining member of the other elongated member, and an elongated pervious panel member positioned between pairs of elongated members with the longitudinal edges of the panel member extending into the longitudinal slots of the elongated members, the panel member having a dimension perpendicular to the longitudinal axis of the elongated members greater than the distance between slots of pairs of elongated members and the panel member being curved and bowed outwardly and contacting the slot side wall defining members, the slots having sufficient width to receive the curved marginal edges of the panel member, the elongated panel member comprising a sheet of wire fabric in which the total cross-sectional area of the openings therein are greater than the cross-sectional areas of the material forming the sheet.

References Cited in the file of this patent

UNITED STATES PATENTS

| | | |
|---|---|---|
| 1,383,787 | Calhoon | July 5, 1921 |
| 2,705,910 | Collins et al. | Apr. 12, 1955 |

FOREIGN PATENTS

| | | |
|---|---|---|
| 245,971 | Great Britain | Jan. 21, 1926 |